United States Patent
Jeon et al.

(10) Patent No.: US 9,800,311 B2
(45) Date of Patent: Oct. 24, 2017

(54) BEAM FORMATION FOR DATA TRANSMISSION FOR TWO-WAY MULTI-ANTENNA RELAY SYSTEM WITH PHYSICAL NETWORK CODING

(71) Applicant: ELECTRONICS AND TELECOMMUNICATIONS RESEARCH INSTITUTE, Daejeon (KR)

(72) Inventors: Young Il Jeon, Daejeon (KR); Youn Ok Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/983,503

(22) Filed: Dec. 29, 2015

(65) Prior Publication Data

US 2016/0191134 A1    Jun. 30, 2016

(30) Foreign Application Priority Data

Dec. 30, 2014 (KR) .................... 10-2014-0194071
Oct. 20, 2015 (KR) .................... 10-2015-0146220

(51) Int. Cl.
H04B 7/02 (2017.01)
H04L 1/02 (2006.01)
H04B 7/06 (2006.01)
H04B 7/155 (2006.01)

(52) U.S. Cl.
CPC ....... H04B 7/0617 (2013.01); H04B 7/15521 (2013.01); Y02B 60/50 (2013.01)

(58) Field of Classification Search
CPC .................... H04B 7/0617; H04B 7/15521
See application file for complete search history.

(56) References Cited

U.S. PATENT DOCUMENTS 8,270,333 B2 *  9/2012  Wu ............... H04B 7/15521
                                            370/312
2007/0098123 A1 * 5/2007  Hara ............. H04B 7/0617
                                            375/347

(Continued)

FOREIGN PATENT DOCUMENTS

KR    10-2012-0094405 A    8/2012
KR    10-2013-0067115 A    6/2013

(Continued)

*Primary Examiner* — Shuwang Liu
*Assistant Examiner* — Sung Ahn
(74) *Attorney, Agent, or Firm* — Rabin & Berdo, P.C.

(57) ABSTRACT

Provided is a data transmission method using physical network coding in a relay station. The method may include an operation of receiving a first signal and a second signal from first and the second nodes, respectively, an operation of generating a third signal to which a physical network coding is applied based on the first signal and the second signal, an operation of forming a beam which maximizes a lower effective power between effective power of the first channel between the relay station and the first node and effective power of the second channel between the relay station and the second node, and an operation of transmitting the third signal to the first node and the second node based on the beam.

13 Claims, 4 Drawing Sheets

(56) References Cited

U.S. PATENT DOCUMENTS

| | | | | |
|---|---|---|---|---|
| 2007/0149117 A1* | 6/2007 | Hwang | ............... | H04B 7/1555 455/11.1 |
| 2007/0160014 A1* | 7/2007 | Larsson | ............... | H04B 7/022 370/338 |
| 2008/0198071 A1* | 8/2008 | Hwang | ............... | H04B 7/0447 342/373 |
| 2008/0247407 A1* | 10/2008 | Westphal | ......... | H04W 72/1257 370/406 |
| 2009/0067533 A1* | 3/2009 | Yuan | ................... | H04B 7/0697 375/267 |
| 2009/0143008 A1* | 6/2009 | Hottinen | ............. | H04B 7/0617 455/11.1 |
| 2010/0272005 A1* | 10/2010 | Larsson | ............ | H04B 7/15564 370/315 |
| 2011/0110345 A1* | 5/2011 | Heidari | ................ | H04W 40/06 370/338 |
| 2011/0249613 A1* | 10/2011 | Sun | ....................... | H04B 7/024 370/315 |
| 2011/0268015 A1* | 11/2011 | Xiao | ................... | H04B 1/3822 370/315 |
| 2013/0044683 A1* | 2/2013 | Maltsev | .............. | H04B 7/0404 370/328 |
| 2013/0114650 A1* | 5/2013 | Li | ......................... | H04B 7/022 375/211 |
| 2013/0148563 A1* | 6/2013 | Brueck | ................. | H04W 4/06 370/312 |
| 2014/0146684 A1* | 5/2014 | Shin | ...................... | H04B 7/026 370/241 |

FOREIGN PATENT DOCUMENTS

| | | | |
|---|---|---|---|
| KR | 10-1298083 B1 | 8/2013 | |
| KR | 10-1331340 B1 | 11/2013 | |
| KR | 10-1410054 B1 | 6/2014 | |

* cited by examiner

FIG.4

BEAM FORMATION FOR DATA TRANSMISSION FOR TWO-WAY MULTI-ANTENNA RELAY SYSTEM WITH PHYSICAL NETWORK CODING

CROSS-REFERENCE TO RELATED APPLICATIONS

This application claims priority to and the benefit of Korean Patent Application No. 10-2014-0194071 filed in the Korean Intellectual Property Office on Dec. 30, 2014 and No. 10-2015-0146220 filed in the Korean Intellectual Property Office on Oct. 20, 2015 the entire contents of which are incorporated herein by reference.

TECHNICAL FIELD

Various exemplary embodiments of the present invention relate to beam forming, a multi-antenna relay, a two-way relay system, and a physical network coding.

BACKGROUND ART

Figure 1:
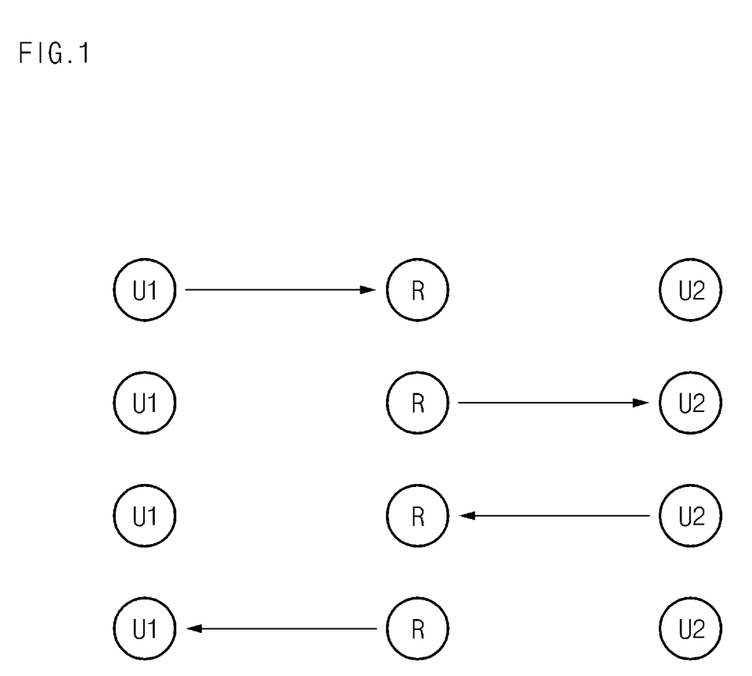
FIG. 1 is a view illustrating a process of exchanging information using a relay station by both end users in a relay station system of the related art.

In a relay station system of the related art, when both end users U1 and U2 exchange information using a relay station R, as known from FIG. 1, a total of four data transmission processes are required.

In order to reduce the number of four transmission processes, a two-way relay station system using network coding has been in the spotlight.

Figure 2:
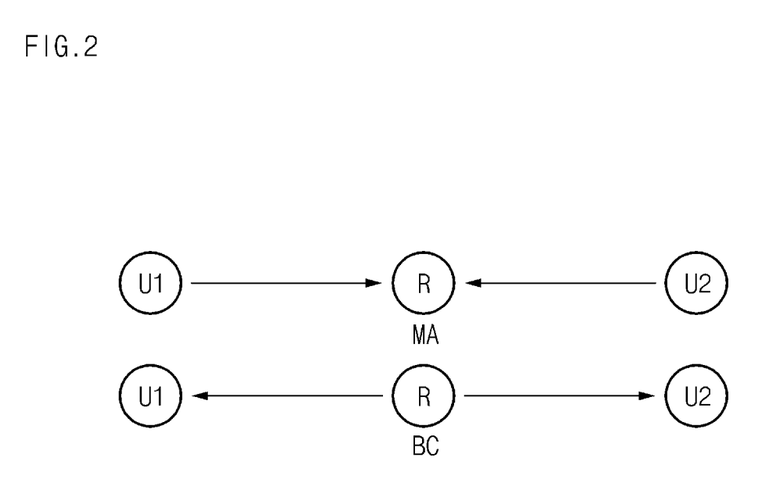
FIG. 2 is a view illustrating a multiple access (MA) process and a broadcast (BS) process.

As illustrated in FIG. 2, in the above system, the users U1 and U2 simultaneously transmit the individual information to the relay station during a first transmission process and the relay station receives the information to apply network coding. In a second transmission process, data produced by doing this is simultaneously transmitted to the users U1 and U2. The users U1 and U2 remove information which is transmitted by themselves and already known from the received information to obtain information of the other party.

The first transmission process is referred to as a multiple access (MA) process and the second transmission process is referred to as a broadcast (BC) process.

The network coding method which is applied in the relay station includes an analog network coding (ANC) and a physical network coding (PNC).

According to the ANC, the relay station adjusts power of the signals received from both users to generate network coding information which will be transmitted in the BC process and according to the PNC, the relay station decodes information received from both users to generate network coding information which will be transmitted during the BC process using an operation such as an exclusive logic sum (XOR).

However, the ANC has restrictions that the user requires not only channel information between the user and the relay station but also channel information between the other user and the relay station and a drawback in that noise is increased.

However, as compared with the ANC, in the PNC, the user needs to know only a channel between the user and the relay station and the signal is decoded in the relay station so that there is no increase in noise.

According to a beam forming method of a two-way relay system in the related art, it is designed without considering the PNC so that in the PNC, maximum performance is not obtained or even though the PNC is considered, it is not optimized to maximize a maximum QoS of both users.

SUMMARY OF THE INVENTION

The present invention has been made in an effort to provide a beam forming method of a relay station having a multi-antenna in a two-way relay communication system to which a physical layer network coding PNC is applied.

The present invention has also been made in an effort to provide a beam forming method which maximizes a quality of service (QoS, communication quality) in a two-way multi antenna relay station communication system to which a physical layer network coding (PNC) is applied.

Technical objects of the present invention are not limited to the aforementioned technical objects and other technical objects which are not mentioned will be apparently appreciated by those skilled in the art from the following description.

An exemplary embodiment of the present invention provides a data transmitting method using a physical network coding in a relay station, including: an operation of receiving a first signal and a second signal from first and second users, respectively, an operation of generating a third signal to which a physical network coding is applied based on the first signal and the second signal, an operation of forming a beam which maximizes a lower effective power between an effective power of the first channel between the relay station and the first user and an effective power of the second channel between the relay station and the second user, and an operation of transmitting the third signal to the first node and the second node based on the beam.

Another exemplary embodiment of the present invention provides a data transceiving device using a physical network coding, including: a communication unit which receives a first signal from a first node and a second signal from a second node; a signal generating unit which generates a third signal to which the physical network coding is applied based on the first signal and the second signal; and a plurality of antennas which is electrically connected to the communication unit and forms a beam which maximizes a lower effective power between effective power of the first channel between the data transceiving device and the first node and effective power of the second channel between the data transceiving device and the second node. Further, the communication unit may transmit the third signal to the first node and the second node based on the beam.

Yet another exemplary embodiment of the present invention provides a recording medium in which a computer readable command is stored which, when the command is executed by a processor of an electronic device, may store commands which allow the electronic device to perform an operation of receiving a first signal and a second signal from first and second users, respectively, an operation of generating a third signal to which a physical network coding is applied based on the first signal and the second signal, an operation of forming a beam which maximizes a lower effective power between an effective power of the first channel between the relay station and the first user and an effective power of the second channel between the relay station and the second user, and an operation of transmitting the third signal to the first user and the second user based on the beam.

Even though a case to which a PNC of the related art is not applied is focused or a condition for satisfying QoS is not solved, so that sub optimal method is suggested, according to the exemplary embodiment of the present invention, an optimal beam which maximizes a quality of service (QoS) may be obtained in a two-way multi antenna relay station communication system to which a physical layer network coding PNC is applied without performing a repeated process.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings. In this case, like components are denoted by like reference numerals in the drawings as much as possible. Further, a detailed description of a function and/or a configuration which has been already publicly known will be omitted. In the following description, parts which are required to understand an operation according to various exemplary embodiments will be mainly described and a description of components which may cloud a gist of the description will be omitted. Some components of the drawings will be exaggerated, omitted, or schematically illustrated. However, a size of the component does not completely reflect an actual size and thus the description is not limited by a relative size or interval of the components illustrated in the drawings.

In an MA process of FIG. 2, a relay station R decodes signals received from two users U1 and U2 to generate a signal $S_R$ to which a PNC to be simultaneously transmitted to the users U1 and U2 during the BC process is applied.

In this case, the network coding includes all codings which are designed to allow the user $U_1$ to obtain information $S_2$ of the other user by removing (self-interference cancellation) his/her own information from $S_R$ using his/her own information $S_1$ and the user $U_2$ to also obtain the information $S_1$ by removing $S_2$ from $S_R$ and, for example, includes an XOR method or a modulo method.

The relay station R may obtain information of the channel of the BC process during the MA process, that is, a channel between R and the users U1 and U2 using a feedback path in case of a frequency division method (FDD) and a channel reciprocity of a time division method (TDD).

The relay station R may form a beam which maximizes the QoS of the users U1 and U2 using the channel information obtained as described above and a multi antenna.

When a beam formed in the relay station is w, a channel vector of a relay station R and a user $k \in \{1, 2\}$ is $h_k$, and a noise of the user k is $n_k$, a signal $y_k$ which is received by the user k during the BC process may be represented by Equation 1.

$$y_k = h_k w s_R + n_k \qquad \text{[Equation 1]}$$

By doing this, it is understood that an SNR of each user is determined by power $G_k = \|h_k w\|^2$ of an effective channel which is received by the user. Therefore, in order to increase QoS for the entire system, w is designed such that a smaller power between effective powers $G_1$ and $G_2$ of the channel through which two users pass is maximized and when Gmin is a smaller power between $G_1$ and $G_2$, this problem is a problem which solves Equation 2.

$$\max_w G_{min} \text{ s.t. } \|w\|^2 = 1 \qquad \text{[Equation 2]}$$

The method of the related art does not obtain a solution of Equation 2, such that an approximate repetition method is used or a suboptimal solution is obtained. When it is assumed that when there is no other user, a solution of Equation 2 is $$w_k = \frac{h_k^*}{\|h_k\|},$$

a solution of the above equation needs to be on a plane on which G1 and G2 are spanned.

Therefore, similar to Equation 3, the solution of Equation 2 may be represented by a function of θ and t.

$$w = \frac{tw_1 + (1-t)e^{-j\theta}w_2}{\|tw_1 + (1-t)e^{-j\theta}w_2\|}, \qquad \text{[Equation 3]}$$

$0 \le \theta \le 2\pi$, $0 \le t \le 1$

When applying this, it is understood that Equation 2 is maximized at $\theta = \angle h_1^T h_2^*$;

When applying this, $G_1$ and $G_2$ may be represented by a function of t, as represented in Equation 4 and Equation 5.

$$G_1(t) = \|h_1\| \frac{\chi + t(1-\chi)}{\sqrt{1 - 2t(1-t)(1-\chi)}}, \chi = \frac{|h_1^T h_2^*|}{\|h_1\|\|h_2\|} \qquad \text{[Equation 4]}$$

$$G_2(t) = \|h_2\| \frac{1 - t(1-\chi)}{\sqrt{1 - 2t(1-t)(1-\chi)}}, \chi = \frac{|h_1^T h_2^*|}{\|h_1\|\|h_2\|} \qquad \text{[Equation 5]}$$

Since a condition of $$\frac{dG_1(t)}{dt} \ge 0$$

is satisfied under a given condition of $0 \le t \le 1$, $G_1(t)$ is a monotone increasing function ($\chi\|h_1\| \le G_1(t) \le \|h_1\|$), and since a condition $$\frac{dG_2(t)}{dt} \leq 0$$

is satisfied, $G_2(t)$ is a monotone decreasing function $(\|h_2\| \geq G_1(t) \geq \chi \|h_2\|)$.

Therefore, t which satisfies Equation 2 is $$t = \left[ \frac{\|h_2\| \chi \|h_1\|}{(|h_1| + |h_2|)(1-\chi)} \right]^+ \quad \text{and} \quad [a]^+ = \max(a, 0)$$

(in this case, $\|h_1\| > \|h_2\|$ is satisfied without losing generality).

In summary, an optimized beam formation vector which increases QoS of the entire system may be obtained by Equation 6.

$$w = \frac{tw_1 + (1-t)e^{-j\theta}w_2}{\|tw_1 + (1-t)e^{-j\theta}w_2\|}, \quad \text{[Equation 6]}$$

in this case, $$\theta = \angle h_1^T h_2^* \quad \text{and} \quad t = \left[ \frac{\|h_2\| - \chi \|h_1\|}{(|h_1| + |h_2|)(1-\chi)} \right]^+$$

are satisfied.

Figure 3:
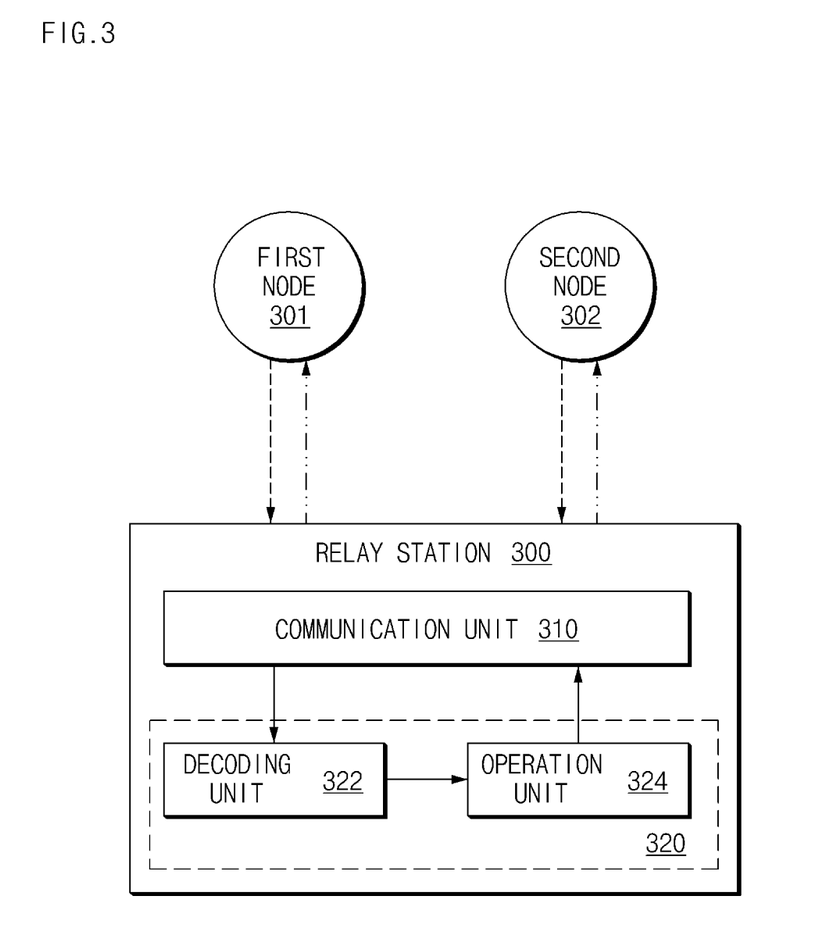
FIG. 3 illustrates an exemplary configuration of a data transceiving device (relay station) according to an exemplary embodiment of the present invention.

FIG. 3 illustrates an exemplary configuration of a data transceiving device (relay station) according to an exemplary embodiment of the present invention.

Referring to FIG. 3, a data transceiving device (for example, a relay station) 300 communicates with a first node 301 and a second node 302. In the following description, the data transceiving device 300 may be referred to as a relay station 300. In the various exemplary embodiments, the relay station 300 may be a device which transmits and receives data to and from a plurality of nodes through multiple access (MA) and broadcast (BC) processes, regardless of the name.

The relay station 300 may include a communication unit 310 and a signal generating unit 320. In some exemplary embodiments, the signal generating unit 320 may be understood as a signal processing unit. Further, even though not illustrated, the relay station 300 may include a plurality of antennas to communicate with the first node 301 and a second node 302 through a wireless network. In the meantime, in the exemplary embodiment of FIG. 1, general or minor components in performing an operation of the present invention may not be illustrated or described. For example, the relay station 300 may include a storage (for example, a memory) or a hardware/software module for various signal processings. For example, the relay station 300 may include a front end module (FEM), an amplifier, and a filter which processes a signal received from the antenna.

The communication unit 310 may communicate with the first node 301 and the second node 302. Here, the first node 301 and the second node 302 may correspond to the first user and the second user described above, respectively. The first node 301, the second node 302, the first user, and the second user disclosed in this specification may be understood as concepts corresponding to devices which form a network topology.

In the information exchanging process described above, for example, the communication unit 310 may receive information (data) from the first node 301 and the second node 302 during the MA process. This process is illustrated with a dotted line in FIG. 3. During the BC process, the communication unit 310 may transmit information to the first node 301 and the second node 302. This process is illustrated with a two-dot chain line in FIG. 3. According to the exemplary embodiment of the present invention, the relay station 300 may transmit the same signal to the first node 301 and the second node 302 during the BC process. In the following description, a signal received from the first node 301 is referred to as a first signal, a signal received from the second node 302 is referred to as a second signal, and a signal which is transmitted to the first node 301 and the second node 302 is referred to as a third signal.

The signal generating unit 320 may generate the third signal based on the first signal and the second signal. Here, the third signal may be generated such that information on the second signal is obtained based on information on the first signal and information on the first signal is obtained based on information on the second signal. In other words, when the first node 301 receives the third signal from the relay station 300, the first node 301 may obtain information corresponding to the second signal from the third signal using the first signal which is transmitted by itself or information corresponding to the first signal. Similarly, when the second node 302 receives the third signal from the relay station 300, the second node 302 may obtain information corresponding to the first signal from the third signal using the second signal which is transmitted by itself or information corresponding to the second signal.

The signal generating unit 320 may include a decoding unit 322 and a calculation unit 324. The decoding unit 322 decodes the first signal to obtain first information and decodes the second signal to obtain second information. The calculation unit 324 applies a designated logic operation such as an exclusive logic sum XOR or a modulo operation to the first information and the second information which are obtained by the decoding unit 322 to generate the third signal.

In the various exemplary embodiments, the signal generating unit 320 may correspond to a processor. In one exemplary embodiment, the decoding unit 322 and the calculation unit 324 are embodied by different processors or one processor. In one exemplary embodiment, in the storage of the relay station 300, commands corresponding to operations of the decoding unit 322 and the calculation unit 324 are stored and the commands are executed by the processors to initiate the operations of the decoding unit 322 and the calculation unit 324.

The third signal generated by the calculation unit 324 may be transmitted to the first node and the second node by a beam which is formed to maximize lower effective power between effective power of a first channel between the relay station 300 and the first node and effective power of a second channel between the relay station 300 and the second node, by the multi-antenna which is electrically connected to the communication unit 310.

As described above referring to FIG. 2, the beam w according to the exemplary embodiment of the present invention may be formed on a plane where a first beam w1 formed based on the first channel when it is assumed that the second node is not present and a second beam w2 formed based on the second channel when it is assumed that the first node is not present are spanned. For example, the communication unit 310 may form the beam based on a ratio of sizes of a complex conjugation vector of a first channel vector (h_1) corresponding to the first channel and the first channel vector. In other words, the communication unit 310 may form the beam based on $$w_k = \frac{h_k^*}{\|h_k\|}$$

(k=1 in the first node and k=2 in the second node). In this case, the beam w is formed to satisfy Equation $$w = \frac{tw_1 + (1-t)e^{-j\theta}w_2}{\|tw_1 + (1-t)e^{-j\theta}w_2\|}, \text{ and}$$

$$\theta = \angle h_1^T h_2^* \text{ and}$$

$$t = \left[\frac{\|h_2\| - \chi\|h_1\|}{(|h_1|+|h_2|)(1-\chi)}\right]^+$$

are satisfied.

Figure 4:
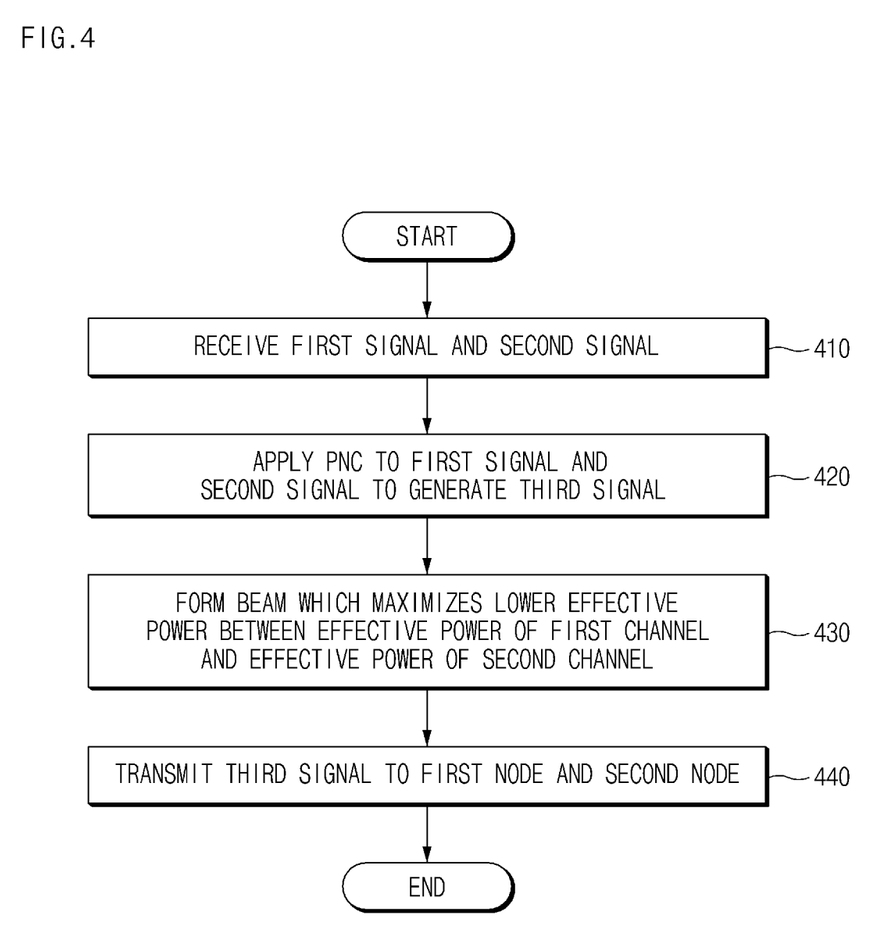
FIG. 4 is an exemplary flowchart of a data transmitting method according to an exemplary embodiment.

FIG. 4 is an exemplary flowchart of a data transmitting method according to an exemplary embodiment. In the following description, redundant, corresponding, or similar description to the above description will be omitted.

In operation 410, a relay station 300 receives a first signal from a first node and receives a second signal from a second node. This process may correspond to the MA operation described above.

The relay station 300 may generate a third signal to which a physical network coding is applied, based on the first signal and the second signal in an operation 420. For example, the signal generating unit 320 decodes the first signal to obtain first information, decodes the second signal to obtain second information, and applies a designated logic operation to the obtained first information and second information to generate the third signal.

In operation 430, the relay station 300 may form a beam which maximizes a lower effective power between effective power of the first channel between the relay station 300 and the first node and effective power of the second channel between the relay station 300 and the second node. For example, the communication unit 310 may form the beam on a plane where a first beam formed based on the first channel when it is assumed that the second node is not present and a second beam formed based on the second channel when it is assumed that the first node is not present are spanned.

In operation 440, the relay station 300 may transmit the third signal to the first node 301 and the second node 302 based on the beam formed in operation 430.

In this specification, components represented as means to perform a specific function may include an arbitrary method which performs a specific function and include a combination of circuit elements which performs a specific function or an arbitrary type of software including a firmware or microcode which is coupled to an appropriate circuit which executes the software in order to perform the specific function. For example, an exemplary embodiment of the present invention may be a recording medium in which a computer readable command is stored. When the command is executed by a processor of an electronic device, the recording medium may include commands which allow an electronic device to perform an operation of receiving the first signal and the second signal from the first and the second nodes, respectively, an operation of generating a third signal to which a physical network coding is applied based on the first signal and the second signal, an operation of forming a beam which maximizes lower effective power between effective power of the first channel between the relay station and the first node and effective power of the second channel between the relay station and the second node, and an operation of transmitting the third signal to the first node and the second node based on the beam. In addition, commands which perform various methods and functions may be stored in the recording medium.

In this specification, "an exemplary embodiment" of principles of the present invention and various modifications of the expression indicate that a specific characteristic, a structure, or a property related with the exemplary embodiment is included in at least one exemplary embodiment of the principle of the present invention. Therefore, expressions "in one exemplary embodiment" and arbitrary other modified examples which are disclosed throughout the specification may refer not all the same exemplary embodiment.

All exemplary embodiments and conditional examples disclosed in the specification are described in order to help those skilled in the art to understand a principle and a concept of the present invention. Therefore, those skilled in the art may understand that the present invention may be modified without departing from an essential feature of the present invention. Therefore, the disclosed exemplary embodiments may be considered by way of illustration rather than limitation. The scope of the present invention is presented not in the above description but in the claims and it may be interpreted that all differences within an equivalent range thereto may be included in the present invention.

What is claimed is:

1. A data transmission method using physical network coding in a relay station, the method comprising:

receiving a first signal from a first node and a second signal from a second node;

generating a third signal to which the physical network coding is applied based on the first signal and the second signal;

determining a beam-forming matrix which maximizes a lower effective power between an effective power of a first channel and an effective power of a second channel; and transmitting the third signal to the first node and the second node using the beam-forming matrix, wherein the first channel is formed between the relay station and the first node, the second channel is formed between the relay station and the second node, and the beam-forming matrix is determined on a plane where a first beam-forming matrix for the first channel when it is assumed that the second node is not present and a second beam-forming matrix for the second channel when it is assumed that the first node is not present are spanned.

2. The method of claim 1, wherein the generating of a third signal includes:

obtaining first information by decoding the first signal;

obtaining second information by decoding the second signal; and applying a designated logic operation to the first information and the second information to generate the third signal.

3. The method of claim 2, wherein the designated logic operation includes at least one of an exclusive logic sum (XOR) and a modulo operation.

4. The method of claim 1, wherein the third signal is generated such that information on the second signal is obtained based on information on the first signal and information on the first signal is obtained based on information on the second signal.

5. The method of claim 1, wherein the first beam-forming matrix is generated based on a ratio of sizes of a complex conjugation vector of a first channel vector corresponding to the first channel and the first channel vector.

6. The method of claim 1, wherein the beam-forming matrix is generated to satisfy Equation $$w = \frac{tw_1 + (1-t)e^{-j\theta}w_2}{\|tw_1 + (1-t)e^{-j\theta}w_2\|}, \quad 0 \leq \theta \leq 2\pi, 0 \leq t \leq 1,$$

$$\theta = \angle h_1^T h_2^*,$$

$$t = \left[\frac{\|h_2\| - \chi\|h_1\|}{(|h_1|+|h_2|)(1-\chi)}\right]^+, \quad \text{and} \quad \chi = \frac{|h_1^T h_2^*|}{\|h_1\|\|h_2\|},$$

wherein
  w is the beam-forming matrix used for transmission of the third signal,
  w1 is the first beam-forming matrix for the first channel,
  w2 is the second beam-forming matrix for the second channel,
  h1 is the first channel vector corresponding to the first channel,
  h2 is a second channel vector corresponding to the second channel, and
  h*1 and h*2 are respectively complex conjugation vectors of h1 and h2.

7. A data transceiving device using a physical network coding, comprising:
  a communication unit which receives a first signal from a first node and a second signal from a second node;
  a signal generating unit which generates a third signal to which the physical network coding is applied based on the first signal and the second signal; and
  a plurality of antennas which is electrically connected to the communication unit and determines a beam-forming matrix which maximizes a lower effective power between an effective power of a first channel and an effective power of a second channel, wherein
  the communication unit transmits the third signal to the first node and the second node using the beam-forming matrix,
  the first channel is formed between the data transceiving device and the first node,
  the second channel is formed between the data transceiving device and the second node, and
  the beam-forming matrix is determined on a plane where a first beam-forming matrix for the first channel when it is assumed that the second node is not present and a second beam-forming matrix for the second channel when it is assumed that the first node is not present are spanned.

8. The data transceiving device of claim 7, wherein the signal generating unit includes a decoding unit which decodes the first signal to obtain first information and decodes the second signal to obtain second information, and an operation unit which applies a designated logic operation to the first information and the second information to generate the third signal.

9. The data transceiving device of claim 8, wherein the designated logic operation includes at least one of an exclusive logic sum (XOR) and a modular operation.

10. The data transceiving device of claim 7, wherein the third signal is generated such that information on the second signal is obtained based on information on the first signal and information on the first signal is obtained based on information on the second signal.

11. The data transceiving device of claim 7, wherein the first beam-forming matrix is formed based on a ratio of sizes of a complex conjugation vector of a first channel vector corresponding to the first channel and the first channel vector.

12. The data transceiving device of claim 7, wherein the beam is formed to satisfy Equation $$w = \frac{tw_1 + (1-t)e^{-j\theta}w_2}{\|tw_1 + (1-t)e^{-j\theta}w_2\|},$$

$$\theta = \angle h_1^T h_2^*,$$

$$t = \left[\frac{\|h_2\| - \chi\|h_1\|}{(|h_1|+|h_2|)(1-\chi)}\right]^+, \quad \text{and} \quad \chi = \frac{|h_1^T h_2^*|}{\|h_1\|\|h_2\|},$$

wherein
  w is the beam-forming matrix used for transmission of the third signal,
  w1 is the first beam-forming matrix for the first channel,
  w2 is the second beam-forming matrix for the second channel,
  h1 is the first channel vector corresponding to the first channel,
  h2 is a second channel vector corresponding to the second channel, and
  h*1 and h*2 are respectively complex conjugation vectors of h1 and h2.

13. A non-transitory recording medium in which a computer readable command is stored which, when the command is executed by a processor of an electronic device, allows an electronic device to perform:
  receiving a first signal from a first node and a second signal from a second node;
  generating a third signal to which the physical network coding is applied based on the first signal and the second signal;
  determining a beam-forming matrix which maximizes a lower effective power between an effective power of a first channel and an effective power of a second channel; and
  transmitting the third signal to the first node and the second node using the beam-forming matrix, wherein
  the first channel is formed between the electronic device and the first node,
  the second channel is formed between the electronic device and the second node, and
  the beam-forming matrix is determined on a plane where a first beam-forming matrix for the first channel when it is assumed that the second node is not present and a second beam-forming matrix for the second channel when it is assumed that the first node is not present are spanned.

* * * * *